(12) United States Patent
Jang et al.

(10) Patent No.: US 10,733,627 B2
(45) Date of Patent: *Aug. 4, 2020

(54) METHOD AND APPARATUS FOR PROVIDING ADVERTISING CONTENT

(71) Applicant: SAMSUNG ELECTRONICS CO., LTD., Suwon-si (KR)

(72) Inventors: Jong-hyuk Jang, Suwon-si (KR); Kill-yeon Kim, Suwon-si (KR); Jeong-wun Jee, Suwon-si (KR); Jun-seong Hong, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/410,682

(22) Filed: May 13, 2019

(65) Prior Publication Data

US 2019/0266636 A1 Aug. 29, 2019

Related U.S. Application Data

(63) Continuation of application No. 14/881,674, filed on Oct. 13, 2015, now Pat. No. 10,332,147.

(30) Foreign Application Priority Data

Oct. 13, 2014 (KR) .................. 10-2014-0137855

(51) Int. Cl.
*G06Q 30/02* (2012.01)
*G06F 3/14* (2006.01)
*G09G 5/12* (2006.01)

(52) U.S. Cl.
CPC ....... *G06Q 30/0255* (2013.01); *G06F 3/1423* (2013.01); *G06Q 30/0261* (2013.01);
(Continued)

(58) Field of Classification Search
CPC combination set(s) only.
See application file for complete search history.

(56) References Cited

U.S. PATENT DOCUMENTS 8,284,061 B1 10/2012 Dione
2003/0163369 A1 8/2003 Arr
(Continued)

FOREIGN PATENT DOCUMENTS

CN 1622656 A 6/2005
EP 1534023 A1 5/2005
(Continued)

OTHER PUBLICATIONS

Communication dated Dec. 18, 2018, from the European Patent Office in counterpart European Application No. 15850689.9.
(Continued)

*Primary Examiner* — Mario C. Iosif
(74) *Attorney, Agent, or Firm* — Sughrue Mion, PLLC

(57) ABSTRACT

A method for providing advertising content, performed by a display device, the method including forming a first pairing between a first terminal and the display device; receiving first advertising content from an advertising server corresponding to a first habit of a user of the first terminal; allocating the first advertising content to a first region among a plurality of regions of a display unit according to at least one of a distance between the first terminal and the display device and a duration for which the first pairing is maintained; and displaying the first advertising content on the first region.

20 Claims, 12 Drawing Sheets

(52) U.S. Cl.
CPC ..... *G06Q 30/0271* (2013.01); *G06Q 30/0272* (2013.01); *G06Q 30/0281* (2013.01); *G09G 5/12* (2013.01); *G09G 2370/022* (2013.01); *G09G 2370/042* (2013.01)

(56) References Cited

U.S. PATENT DOCUMENTS

| | | | |
|---|---|---|---|
| 2005/0114212 | A1 | 5/2005 | Carrez et al. |
| 2008/0108308 | A1 | 5/2008 | Ullah |
| 2009/0256780 | A1 | 10/2009 | Small et al. |
| 2011/0016006 | A1 | 1/2011 | Opdycke |
| 2014/0062852 | A1 | 3/2014 | Naveh |
| 2014/0143060 | A1 | 5/2014 | Fernandez |
| 2014/0304072 | A1* | 10/2014 | Rider ............... G06Q 30/0255 705/14.53 |
| 2014/0340334 | A1 | 11/2014 | Cho |
| 2015/0084838 | A1 | 3/2015 | Chang |
| 2015/0170209 | A1 | 6/2015 | Smith |
| 2015/0249756 | A1 | 9/2015 | Motegi |
| 2015/0319224 | A1 | 11/2015 | Rong |

FOREIGN PATENT DOCUMENTS

| | | |
|---|---|---|
| JP | 2006-78990 A | 3/2006 |
| KR | 10-0988506 B1 | 10/2010 |
| KR | 10-1106057 B1 | 1/2012 |
| KR | 10-2012-0026282 A | 3/2012 |

OTHER PUBLICATIONS

Communication dated Jan. 26, 2016 issued by the International Search Authority in counterpart International Patent Application No. PCT/KR2015/010770 (PCT/ISA/220/210).

Communication dated Jul. 25, 2017, from the European Patent Office in counterpart European Application No. 15850689.9.

Written Opinion dated Jan. 26, 2016 issued by the International Searching Authority in counterpart International Patent Application No. PCT/KR2015/010770 (PCT/ISA/237).

Communication dated Apr. 1, 2020, issued by the State Intellectual Property Office of P.R. China in counterpart Chinese Application No. 201580067663.8.

Communication dated Jun. 2, 2020, issued by the European Patent Office in counterpart European Application No. 15850689.9.

* cited by examiner

METHOD AND APPARATUS FOR PROVIDING ADVERTISING CONTENT

CROSS-REFERENCE TO RELATED APPLICATION

This application is a Continuation Application of U.S. patent application Ser. No. 14/881,674, filed Oct. 13, 2015, which claims priority from Korean Patent Application No. 10-2014-0137855, filed on Oct. 13, 2014, in the Korean Intellectual Property Office, the disclosure of which is incorporated herein by reference in its entirety.

BACKGROUND

1. Field

Apparatuses and methods consistent with exemplary embodiments relate to providing advertising content, and more particularly, to methods and apparatuses for providing a personalized advertisement to a user of a terminal.

2. Description of the Related Art

Product advertising is actively provided through TV, radio, the Internet, billboards, newspapers, magazines, etc. In a large discount store, a plurality of display apparatuses used for advertising are usually installed in conspicuous places and provide advertising content to customers visiting the store. A central system that integrally manages advertising in a plurality of the large discount stores is established.

A display apparatus displays advertising content to customers. Because a display apparatus displays advertising content regardless of requests or interests of customers, the customers may not receive the best advertisements and the advertising content may be provided inefficiently.

Accordingly, there is a demand for a method and apparatus for providing advertising content that is of interest personally to users.

SUMMARY

Exemplary embodiments address at least the above problems and/or disadvantages and other disadvantages not described above. Also, one or more exemplary embodiments are not required to overcome the disadvantages described above, and an exemplary embodiment may not overcome any of the problems described above.

According to an aspect of an exemplary embodiment, there is provided a method performed by a display device to provide advertising content, the method including: forming a first pairing between a first terminal and the display device; obtaining first advertising content from an advertising server based on a first habit of a user of the first terminal; allocating the first advertising content to a first region among a plurality of regions of a display based on at least one of a first distance between the first terminal and the display device and a duration for which the first pairing is maintained; and may be playing the first advertising content on the first region.

At least one of a number of the plurality of regions and an area of at least one region may be adjusted based on at least one of a distance between the display device and a terminal that forms a pairing with the display device and a duration for which the pairing is maintained.

The method may include allocating to a second region among the plurality of regions, second advertising content corresponding to a second terminal that forms a second pairing with the display device.

In response to at least one of a second distance between the display device and the second terminal being greater than the first distance and a duration for which the second pairing is maintained being less than the duration for which the first pairing is maintained, the allocating of the second advertising content to the second region among the plurality of regions may include allocating the second advertising content to a region having an area that is less than an area of the first region.

In response to at least one of a second distance between the display device and the second terminal being less than the first distance and a duration for which the second pairing is maintained being greater than the duration for which the first pairing is maintained, the allocating of the second advertising content to the second region among the plurality of regions includes allocating the second advertising content to a region having an area that may be greater than an area of the first region.

The method may include forming a pairing between each terminal among a plurality of terminals and the display device; providing a plurality of advertising contents to the plurality of terminals, respectively, and allocating the plurality of advertising contents to the plurality of regions; and may be playing the plurality of advertising contents on the plurality of regions.

Allocating of the plurality of advertising contents to the plurality of regions may include: classifying a plurality of users respectively corresponding to the plurality of terminals into a plurality of groups by using habits of the plurality of users, and obtaining advertising content for each group from the advertising server; and allocating the advertising content for each group to one region among the plurality of regions based on at least one of a distance between a representative terminal of each group and the display device and a duration for which a pairing formed between the representative terminal of each group and the display device may be maintained.

The method may further include receiving an input of the user of the first terminal through an input interface that may be related to the first advertising content.

The method may further include displaying content on the first region in response to the input of the user of the first terminal.

The first habit may be stored in the advertising server and may be based on at least one of a purchased product, a store, a time of purchase, a payment method for the purchased product, and interests of the user of the first terminal.

The method may further include transmitting at least one of the first advertising content and an electronic voucher that may be related to the first advertising content to the first terminal.

According to an aspect of another exemplary embodiment, there is provided a display device for providing advertising content, the display device including: a communication interface configured to form a first pairing with a first terminal; an advertisement obtainer configured to obtain first advertising content from an advertising server, based on a first habit of a user of the first terminal; a controller configured to allocate the first advertising content to a first region among a plurality of regions of a display, based on at least one of a first distance between the first terminal and the display device and a duration for which the first pairing is maintained; and wherein the display is configured to display the first advertising content on the first region.

At least one of a number of the plurality of regions and an area of at least one region may be adjusted based on at least one of a distance between the display device and a terminal that forms a pairing with the display device and a duration for which the pairing may be maintained.

The controller may be further configured to allocate to a second region among the plurality of regions, second advertising content corresponding to a second terminal that forms a second pairing.

The controller may be further configured to, in response to at least one of a second distance between the display device and the second terminal being less than the first distance and a duration for which the second pairing is maintained being less than the duration for which the first pairing is maintained, allocate the second advertising content to a region having an area that is less than an area of the first region.

The controller may be further configured to, in response to at least one of a second distance between the display device and the second terminal being greater than the first distance and a duration for which the second pairing is maintained being greater than the duration for which the first pairing is maintained, allocate the second advertising content to a region having an area that is greater than an area of the first region.

The communication interface may be further configured to form a pairing with each terminal among a plurality of terminals, the controller may be further configured to provide a plurality of advertising contents to the plurality of terminals, respectively, and allocate the plurality of advertising contents to the plurality of regions, and the display may be configured to display the plurality of advertising contents on the plurality of regions.

The advertisement obtainer may be configured to classify a plurality of users respectively corresponding to the plurality of terminals into a plurality of groups by using habits of the plurality of users, and receive advertising content for each group from the advertising server, and the controller may be further configured to allocate the advertising content for each group to one region among the plurality of regions based on at least one of a distance between a representative terminal of each group and the display device and a duration for which pairing formed between the representative terminal and the display device is maintained.

The method may further include an input interface configured to receive an input of the user of the first terminal that may be related to the first advertising content.

According to an aspect of another exemplary embodiment, there is provided a non-transitory computer-readable recording medium having embodied thereon a program for executing a method performed by a display device to provide advertising content, the method including: forming a first pairing between a first terminal and the display device; obtaining first advertising content from an advertising server based on a first habit of a user of the first terminal; allocating the first advertising content to a first region among a plurality of regions of a display based on at least one of a first distance between the first terminal and the display device and a duration for which the first pairing is maintained; and displaying the first advertising content on the first region.

According to an aspect of another exemplary embodiment, there is provided a display device including: an advertisement obtainer configured to obtain first advertising content from an advertising server; a communication interface configured to form a first pairing with a first terminal that is located within a predetermined distance of the display device; a controller configured to assign the first advertising content to a first region among a plurality of regions of a display according to at least one of a first distance between the first terminal and the display device and a duration for which the first pairing is maintained; and wherein the display is configured to display the first advertising content in the first region.

The communication interface may be further configured to, in response to the first pairing being formed with the first terminal, transmit an identifier of the display device to the first terminal.

The controller may be further configured to determine an area of the first region to be inversely proportional to the first distance between the first terminal and the display device.

The controller may be further configured to determine an area of the first region to be directly proportional to the first distance between the first terminal and the display device.

BRIEF DESCRIPTION OF THE DRAWINGS

These and/or other aspects will become apparent and more readily appreciated from the following description of exemplary embodiments, taken in conjunction with the accompanying drawings, in which.

DETAILED DESCRIPTION

Figure 1:
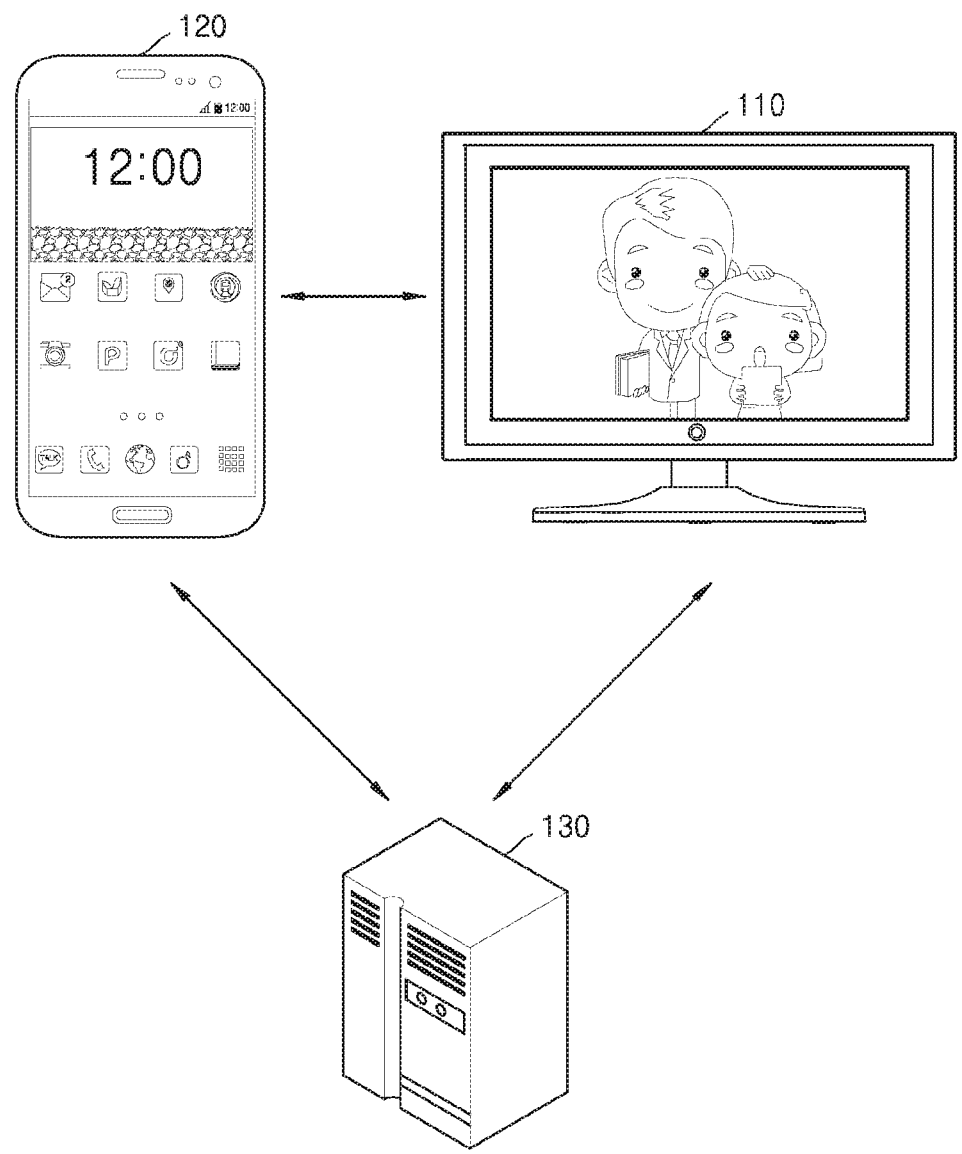
FIG. 1 is a view illustrating a configuration of a system for providing advertising content, according to an exemplary embodiment.

One or more exemplary embodiments will be described in detail below. However, the present disclosure is not limited to exemplary embodiments discussed below. In the drawings, like reference numerals refer to like elements.

The terms used herein are selected among common terms that are widely used in consideration of their function. However, terms may be different according to what a person of ordinary skill in the art would understand them to be, precedent, and new technology.

In some cases, the terms are selected by the applicant for a better understanding and/or convenience of explanation, and the meaning of those terms will be described in detail in the corresponding part of the detailed description. Therefore, terms used herein may not merely be designations of the terms, but terms may be defined based on the meaning of the terms and content throughout.

If something "includes" an element, it is to be understood that other elements may be included, as long as it is not expressly stated otherwise. Terms such as "unit," "module," and the like, may indicate a unit that processes at least one function or motion, and the unit may be implemented by hardware or software, or by a combination of hardware and software.

The term "and/or" may include any and all combinations of one or more of the associated listed items. Expressions such as "at least one of" when preceding a list of elements, modify the entire list of elements and do not modify the individual elements of the list.

FIG. 1 is a view illustrating a configuration of a system 100 for providing advertising content, according to an exemplary embodiment.

According to an exemplary embodiment, the system 100 may include a display device 110, a terminal 120 (e.g., a mobile terminal), and an advertising server 130. The display device 110 may display advertising content on a display screen of the display device 110. The advertising content may be common, or generic, advertising content that is not related to the terminal 120 that is located in the vicinity of the display device 110. Also, the advertising content may be personalized advertising content that is related to the terminal 120 that is located in the vicinity of the display device 110.

According to an exemplary embodiment, the display device 110 may detect the terminal 120 that is located in the vicinity of the display device 110 to provide a personalized advertisement to a user of the terminal 120. For example, the display device 110 may periodically broadcast an advertising message including an identifier (ID) of the display device 110. The terminal 120 may receive the advertising message and may confirm the existence of the display device 110.

According to an exemplary embodiment, the terminal 120 may receive advertising content or an electronic voucher from the display device 110. Also, the terminal 120 may directly receive advertising content or an electronic voucher from the advertising server 130, rather than the display device 110.

The terminal 120 may be a portable terminal. Examples of a portable terminal include a cellular phone, a tablet, a personal communication system (PCS), and a personal data assistant (PDA).

According to an exemplary embodiment, the terminal 120 may receive at least one of advertising content and an electronic voucher that is related to the advertising content from the display device 110 or the advertising server 130.

According to an exemplary embodiment, the advertising server 130 may store advertising content. Also, the advertising server 130 may transmit advertising content that is personalized for a user to the display device 110 or the terminal 120 by using information about the user. The advertising server 130 may analyze information of users of a plurality of the terminals 120 and may classify the users into groups.

According to an exemplary embodiment, as shown in FIG. 1, the advertising server 130 may be an external apparatus that is separate from the display device 110. Also, the advertising server 130 may be provided as a storage unit in the display device 110. Examples of the storage unit may include a hard disk drive (HDD), a read-only memory (ROM), a random-access memory (RAM), a flash memory, and a memory card.

Both a case in which the advertising server 130 is provided in the display device 110 and a case in which the advertising server 130 is provided as an external apparatus that is physically separate from the display device 110 is possible.

According to an exemplary embodiment, the display device 110 may communicate with the terminal 120 and the advertising server 130 through a network. The network may be implemented with a wireless communication technique such as Wireless Fidelity (Wi-Fi), Home Radio Frequency (RF), Bluetooth, Bluetooth Low Energy (BLE), High Rate Wireless Personal Area Network (HR WPAN), Ultra Wide band (UWB), Low Rate Wireless Personal Area Network (LR WPAN), or Institute of Electrical And Electronics Engineers (IEEE) 1394.

According to an exemplary embodiment, the display device 110 may divide a basic advertisement display and a personalized advertisement display and may provide advertising content. The basic advertisement display provides a common advertisement that does not target a user, and the personalized advertisement display unit provides an advertisement that targets a user.

According to an exemplary embodiment, when a plurality of the terminals 120 are located in the vicinity of the display device 110, the display device 110 may divide a display screen into parts and may provide advertising content that is to be provided to users of the plurality of terminals 120 through the parts of the display screen.

A display apparatus and method of providing advertising content will now be explained in detail.

Figure 2:
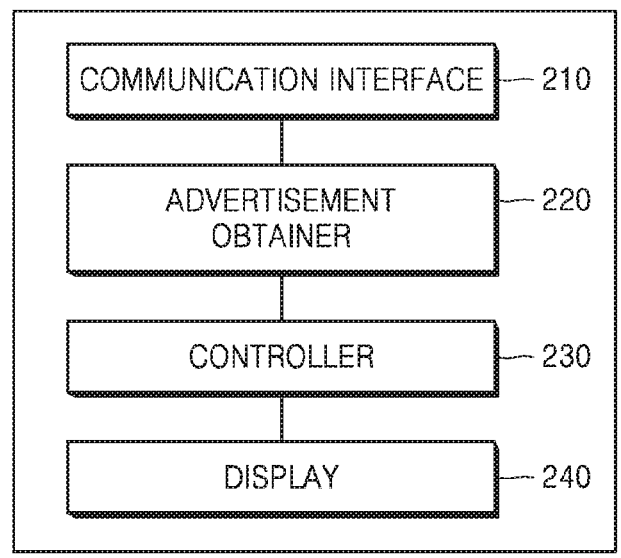
FIG. 2 is a block diagram illustrating a configuration of a display device for providing advertising content, according to an exemplary embodiment.

FIG. 2 is a block diagram illustrating a configuration of the display device 110 for providing advertising content, according to an exemplary embodiment.

According to an exemplary embodiment, the display device 110 may include a communication unit 210 (e.g., communication interface), an advertisement obtaining unit 220 (e.g., advertisement obtainer), a control unit 230 (e.g., controller), and a display unit 240 (e.g., display). However, all of the elements illustrated in FIG. 2 are not essential elements. According to one or more exemplary embodiments, the display device 110 may include more or less elements. The illustrated elements will be described below.

According to an exemplary embodiment, the communication unit 210 may communicate with a plurality of terminals that are located in the vicinity of the display device 110. The communication unit 210 may allow a pairing to be formed between the display device 110 and each of the plurality of terminals.

The communication unit 210 may allow a first pairing to be formed between a first terminal among the plurality of terminals and the display device 110.

According to an exemplary embodiment, the communication unit 210 may periodically broadcast an advertising message including an ID. A terminal that is located in the vicinity of the display device 110 may receive the advertising message and may recognize the ID in the advertising message. The terminal that is located in the vicinity of the display device 110 may form a pairing with the display device 110 by transmitting an ID and information of the terminal to the communication unit 210. The communication unit 210 may transmit advertising content to the terminal that is located in the vicinity of the display device 110.

According to an exemplary embodiment, once the first pairing is formed between the display device 110 and the first terminal, the communication unit 210 may transmit an ID of the first terminal to the advertising server 130. The advertising server 130 may receive the ID of the first terminal, and may detect first shopping propensity information (e.g., shopping habits) corresponding to the ID of the first terminal. The first shopping propensity information may be information that is previously registered by a user of the first terminal or data that is accumulated as the user of the first terminal shops.

According to an exemplary embodiment, the display device 110 may form pairing with each of a plurality of terminals. The communication unit 210 may periodically broadcast an advertising message including an ID of the display device 110. The plurality of terminals may receive the advertising message, and may recognize the ID of the display device 110 in the advertising message. The communication unit 210 may receive IDs of the plurality of terminals from the plurality of terminals. The communication unit 210 may transmit the received IDs of the plurality of terminals to the advertising server 130. The advertising server 130 may receive the IDs of the plurality of terminals, and may detect shopping propensity information of a plurality of users corresponding to the IDs of the plurality of terminals. The advertising server 130 may classify the plurality of users based on the detected shopping propensity information into groups in each of which users having the same shopping propensity are grouped together.

According to an exemplary embodiment, the advertising server 130 may be provided in the display device 110 or may be provided as an external apparatus that is physically separate from the display device 110.

According to an exemplary embodiment, the advertisement obtaining unit 220 may obtain first advertising content that is searched for from the advertising server 130 based on the first shopping propensity information of the user of the first terminal. The first shopping propensity information may include at least one of a purchased product, a store, a time of purchase, a payment method for the purchased product, and interests of the user of the first terminal.

According to an exemplary embodiment, the advertisement obtaining unit 220 may obtain advertising content that is searched for each group from the advertising server 130 based on the groups using the shopping propensity information of the plurality of users corresponding to the plurality of terminals.

According to an exemplary embodiment, the control unit 230 may allocate the first advertising content to a first region among a plurality of regions of the display unit 240 based on a first distance and the first pairing time. The first distance is a distance between the first terminal and the display device 110. The plurality of regions are regions that are obtained by dividing a display screen of the display device 110.

According to an exemplary embodiment, at least one of area of the plurality of regions and a number of the plurality of regions may be adjusted based on a distance between the display device 110 and a terminal that forms a pairing with the display device 110 and a duration for which the pairing is maintained.

For example, the number of the plurality of regions may be determined according to a number of terminals that are located in the vicinity of the display device 110. A terminal that is located in the vicinity (e.g., within a predetermined distance) of the display device 110 may be determined in consideration of a "distance between the display device 110 and the terminal" and a "duration for which a pairing formed between the display device 110 and the terminal is maintained". When the terminal is located in the vicinity of the display device 110 for a period of time that is less than the period of time for which advertising content is to be provided, a user of the terminal may not observe an advertisement provided by the display device 110 until the preview of the advertisement is completed. Accordingly, the display device 110 may provide advertising content in consideration of a pairing time between the display device 110 and the terminal.

According to an exemplary embodiment, while an advertisement is displayed on the display device 110, the areas of the plurality of regions may be adjusted based on a distance between the display device 110 and a terminal. For example, a distance between the display device 110 and the first terminal may be referred to as the first distance and a distance between the display device 110 and a second terminal may be referred to as a second distance. A region that targets the user of the first terminal may be referred to as the first region and a region that targets a user of the second terminal may be referred to as a second region.

The display device 110 may determine the areas of the plurality of regions so that the areas of the plurality of regions are inversely proportional to a distance between the display device and a terminal. When the first distance is less than the second distance, an area of the first region may be adjusted to be greater than an area of the second region. Advertising content may be more efficiently provided to a user of a terminal that is close to the display device 110.

Conversely, the display device 110 may determine the areas of the plurality of regions so that the areas of the plurality of regions are proportional to a distance between the display device 110 and a terminal. When the first distance is greater than the second distance, the area of the first region may be adjusted to be greater than the area of the second region. Therefore, advertising content may be efficiently provided even to a user of a terminal that is far from the display device 110, because it is harder to see the display from farther away.

Before the display device 110 starts advertising, the areas of the plurality of regions may be adjusted based on a distance between the display device 110 and each terminal. Because an area of a portion of the display device 110 on which an advertisement is delivered is limited, the display device 110 may determine a number and areas of regions where advertisements are to be provided based on a distance. The display device 110 may consider a pairing time between the display device 110 and each terminal. The display device 110 may exclude terminals whose pairing times are equal to or less than a predetermined period of time, and may determine a number and areas of a plurality of regions by targeting only terminals whose pairing times are greater than the predetermined period of time.

According to an exemplary embodiment, the control unit 230 may allocate a plurality of pieces of advertising content, which are to be respectively provided to the plurality of terminals, to the plurality of regions. The control unit 230 may allocate advertising content for each group to one of the plurality of regions based on a "distance between a representative terminal for each group and the display device 110" and a "duration for which a pairing that is formed between the representative terminal and the display device 110 is maintained."

According to an exemplary embodiment, the display unit 240 may display the first advertising content on the first region.

According to an exemplary embodiment, the display unit 240 may display the plurality of pieces of advertising content, which are to be respectively provided to the plurality of terminals, on the allocated regions.

According to an exemplary embodiment, the display device 110 may further include an input interface. A user of a terminal may input the user's command to the display device 110 through the input interface. For example, the first advertising content for the user of the first terminal may be displayed on the first region of the display device 110. When the first advertising content is about a "camera of a brand A", the user of the first terminal may input a "model of the camera of the brand A" on the first region of the display screen through the input interface.

When an item needs to be selected by the user of the first terminal who observes the first advertising content, the user of the first terminal may select the item through the input interface.

According to an exemplary embodiment, the display unit 240 may display content corresponding to the input of the user of the first terminal on the first region.

According to an exemplary embodiment, the display device 110 may transmit at least one of the first advertising content and an electronic voucher that is related to the first advertising content to the first terminal. For example, "advertising content related to a camera" may be provided on the display screen of the display device 110. The display device 110 may transmit an "electronic voucher related to the camera" to the first terminal. Examples of the "electronic voucher related to the camera" may include a discount electronic stamp and an electronic coupon related to the camera.

According to an exemplary embodiment, the display device 110 may transmit the electronic voucher that is related to the first advertising content to the first terminal based on a "distance between the display device 110 and the first terminal" and a "duration for which the first pairing that is formed between the display device 110 and the first terminal is maintained".

According to an exemplary embodiment, the display device 110 may control operations of the communication unit 210, the advertisement obtaining unit 220, the control unit 230, and the display unit 240 by using a central arithmetic processor. The central arithmetic processor may be an array of logic gates, or may be a combination of a general-purpose microprocessor and a memory in which a program that may be executed in the microprocessor is stored. Also, it will be understood by one of ordinary skill in the art that the central arithmetic processor may be any of other types of hardware.

Various operations or applications of the display device 110 will be explained below. It will be understood by one of ordinary skill in the art that if any of the communication unit 210, the advertisement obtaining unit 220, the control unit 230, and the display unit 240 is not specified, each operation or application that may be clearly understood or expected by one of ordinary skill in the art is within the scope of the present disclosure, which is not limited by names or physical/logical structures of specific elements.

Figure 3:
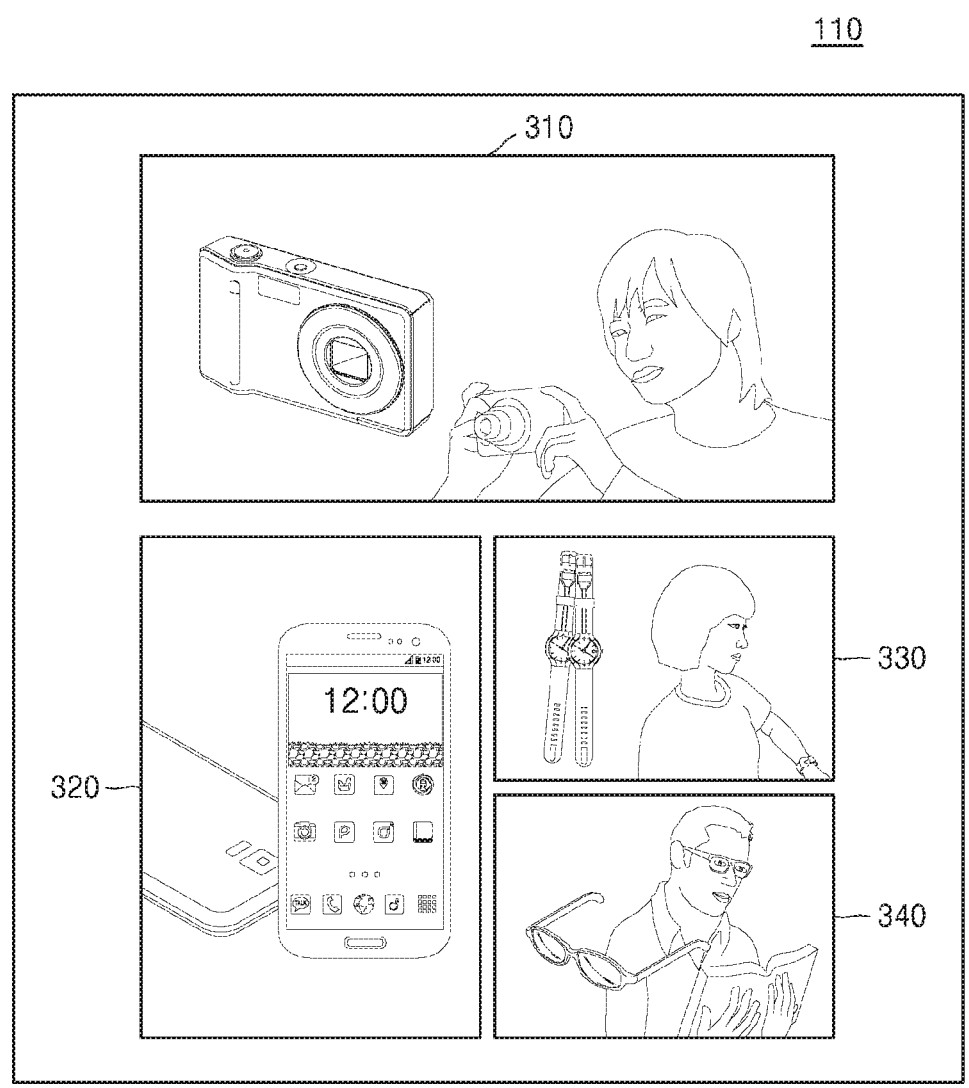
FIG. 3 is a view illustrating advertising content that is displayed on a display screen of a display device, according to an exemplary embodiment.

FIG. 3 is a view illustrating advertising content that is displayed on a display screen of the display device 110 according to an exemplary embodiment.

According to an exemplary embodiment, the display device 110 may divide the display screen into a plurality of parts, and may display advertising content on the divided parts.

As shown in FIG. 3, the display screen of the display device 110 may be divided into regions having various areas.

According to an exemplary embodiment, a common advertisement may be displayed on a region 310 that is the largest among the regions of the display screen of the display device 110. The common advertisement may be an advertisement displayed on all terminals, rather than a specific terminal. Personalized advertisements considering terminals may be displayed on other regions 320, 330, and 340. Exemplary embodiments are not limited to this arrangement.

According to another exemplary embodiment, an advertisement that targets a terminal whose distance to the display device 110 is the smallest or whose pairing time is the longest may be displayed on the region 310 that is the largest among the regions of the display screen of the display device 110.

According to an exemplary embodiment, the display screen of the display device 110 may be divided into regions before advertising is started. A number of advertisements that are to be provided may be determined by detecting terminals that are located in the vicinity of the display device 110. The display device 110 may divide the display screen in consideration of the determined number of the advertisements. The display screen may be divided into a plurality of regions having the same area or different areas.

The display device 110 may divide the display screen in consideration of a distance between the display device 1410 and each of the detected terminals that are located in the vicinity of the display device 110. The distance is a distance between each detected terminal and the display device 110. For example, the display device 110 may display advertising content, which is to be provided to a user of a terminal at a shortest distance, on a largest region and may display advertising content, which is to be provided to a user of a terminal at a farthest distance, on a smallest region.

According to another exemplary embodiment, an area of a portion of the display screen of the display device 110 where advertising is performed may be resized while an advertisement is provided. That is, the area of the portion where advertising is performed may be adjusted in consideration of a state between a terminal and the display device 110.

For example, a distance between the first terminal and the display device 110 may be referred to as the first distance, a distance between the second terminal and the display device 110 may be referred to as the second distance, and a distance between a third terminal and the display device 110 may be referred to as a third distance. When advertising is started, if distances are short and increasing in an order of the first distance, the second distance, and the third distance, the display device 110 may display first advertising content, which is to be provided to the first terminal, on the region 320, second advertising content, which is to be provided to the second terminal, on the region 330, and third advertising content, which is to be provided to the third terminal, on the region 340.

While an advertisement is provided, each distance may be changed. When the first terminal is moved away from the display device 110 and thus the first distance is changed to the shortest, the display device 110 may increase an area of the region 330 and reduce an area of the region 320. As the areas of the region 320 and the region 330 are respectively reduced and increased, the display device 110 may move the region 340 to a portion that is left after the area of the region 320 is reduced.

According to another exemplary embodiment, the display device 110 may receive an input of a user through the input interface. For example, the user may select a desired advertisement through the input interface. Also, if a user wants to select an item in the advertisement, the display device 110 may receive an input of the user through the input interface. In this case, the input interface may be an input interface that may be touched on the display screen of the display device 110. The input interface may be a terminal that is used by the user. The user may directly input information to his/her terminal and may transmit the information to the display device 110.

For example, as shown in FIG. 3, an advertisement about a mobile phone is provided on the region 320. A user who observes the advertisement about the mobile phone may touch the region 320 to obtain detailed information and may obtain the detailed information about the mobile phone. The display device 110 may receive a touch input of the user and may provide response content in response to the touch input on the region 320.

Figure 4:
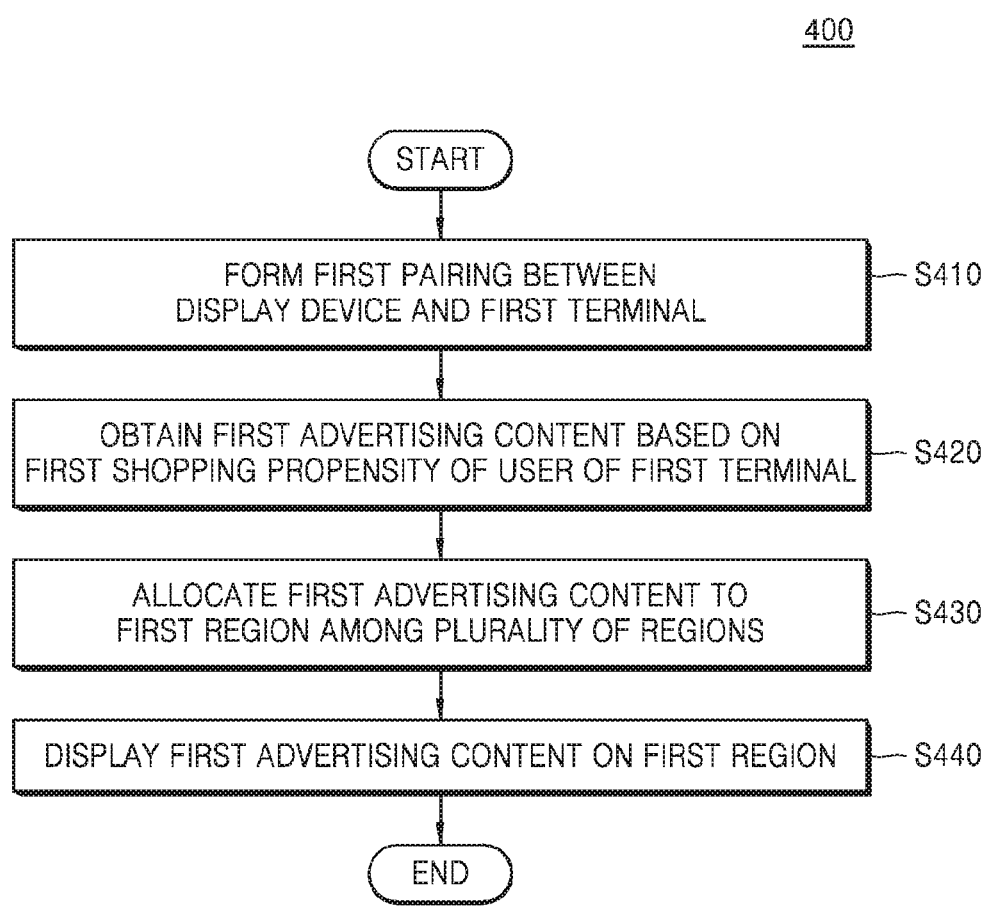
FIG. 4 is a flowchart of a method of providing advertising content, according to an exemplary embodiment.

FIG. 4 is a flowchart of a method of providing advertising content, according to an exemplary embodiment.

As shown in FIG. 4, in operation S410, the display device 110 may form a first pairing with a first terminal. The display device 110 may periodically broadcast an advertising message including an ID of the display device 110. The first terminal that is located in the vicinity of the display device 110 may receive the advertising message, and may recognize the ID of the display device 110 in the advertising message. The first terminal may transmit an ID and information of the first terminal to the display device 110.

In operation S420, the display device 110 may obtain first advertising content that is searched from the advertising server 130. The advertising server 130 may obtain the first advertising content based on first shopping propensity information of a user of the first terminal. The advertising server 130 may be a storage medium (e.g., memory) that is provided in the display device 110 or an external apparatus that is physically separate from the display device 110. Examples of the first advertising content may include a moving image and a photograph.

The first shopping propensity information may be determined based on at least one of a purchased product, a store, a time of purchase, a payment method for the purchased product, and interests of the user of the first terminal.

According to an exemplary embodiment, the first shopping propensity information of the user of the first terminal may be established as data that is accumulated in the advertising server 130 as the user shops in a store.

According to another exemplary embodiment, the first shopping propensity information of the user of the first terminal may be established as the user joins a preset Internet site and inputs information about the user. The advertising server 130 may receive the information of the user from a server of the preset Internet site.

In operation S420, the display device 110 may obtain an ID of the first terminal and may transmit the obtained ID to the advertising server 130. The advertising server 130 may obtain the first shopping propensity information of the user by using the obtained ID. The advertising server 130 may detect first advertising content that is suitable for the user by using the first shopping propensity information of the user. The display device 110 may obtain the first advertising content that is suitable for the user from the advertising server 130.

In operation S430, the display device 110 may allocate the first advertising content to a first region among a plurality of regions. The display device 110 may allocate the first advertising content to the first region based on a first distance between the first terminal and the display device 110 and a duration for which the first pairing is maintained.

According to an exemplary embodiment, areas and a number of the plurality of regions may be determined before advertising is started. At least one of the areas of the plurality of regions and the number of the plurality of regions may be determined based on a "distance between the display device 110 and a terminal that forms a pairing with the display device 110" and a "duration for which the pairing is maintained".

In operation S430, when the first advertising content is allocated to the first region among the plurality of regions, the display device 110 may consider a relationship between the display device 110 and a second terminal. The relationship between the display device 110 and the second terminal may include at least one of a "second distance between the display device 110 and the second terminal" and a "duration time for which a pairing between the display device 110 and the second terminal is maintained". A process of allocating the first advertising content to the first region in consideration of the relationship between the display device 110 and the second terminal will be explained below with reference to FIG. 5.

In operation S440, the display device 110 may display the first advertising content on the first region. Also, the display device 110 may transmit at least one of the first advertising content and an electronic voucher that is related to the first advertising content to the first terminal.

Figure 5:
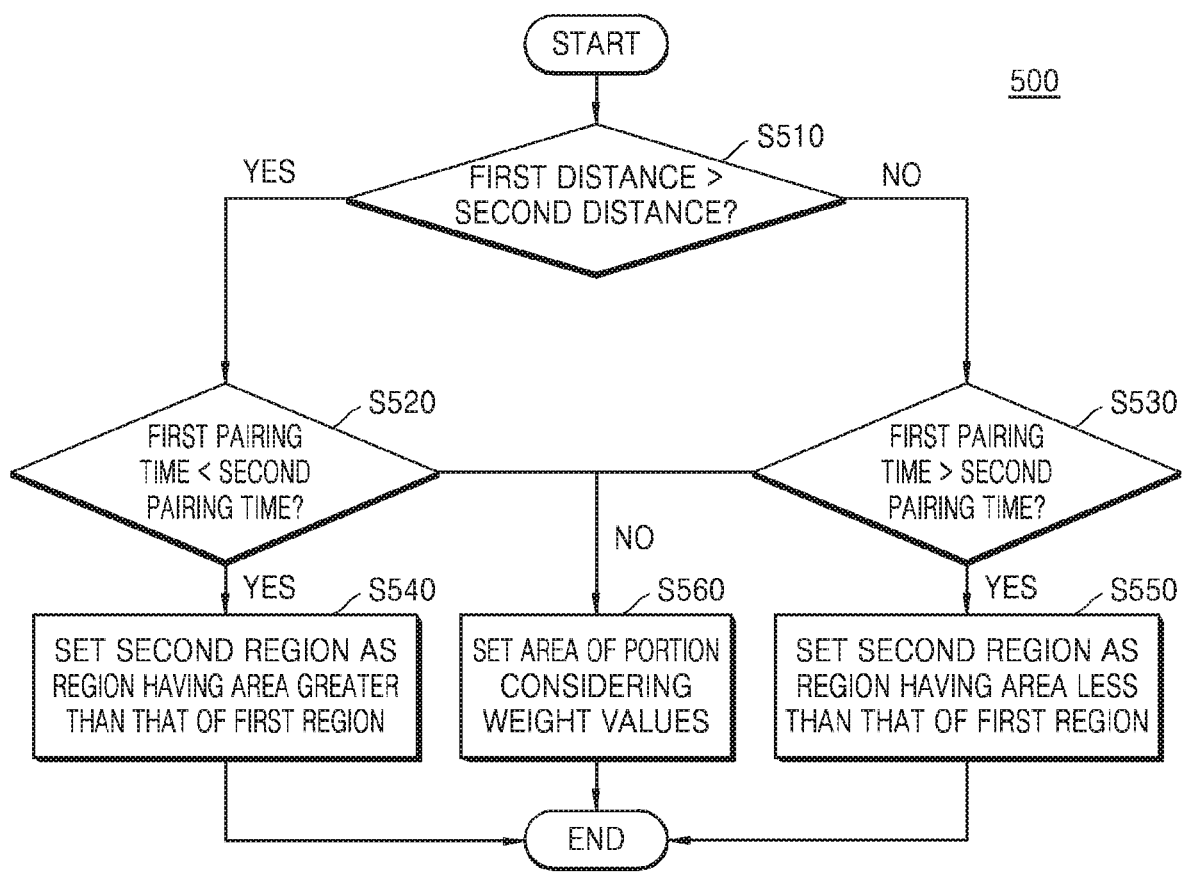
FIG. 5 is a flowchart of a method of allocating a plurality of advertisements to regions of a display unit, according to an exemplary embodiment.

FIG. 5 is a flowchart of a method of allocating a plurality of advertisements to regions of the display unit 240 according to an exemplary embodiment.

According to an exemplary embodiment, the display device 110 may form a first pairing and a second pairing with a first terminal and a second terminal, respectively. The display device 110 may obtain advertising content from the advertising server 130 based on a shopping propensity of a user of each terminal. That is, the display device 110 may obtain first advertising content that is to be provided to the first terminal and second advertising content that is to be provided to the second terminal.

The display device 110 may allocate the first advertising content to a first region among a plurality of regions of the display unit 240 and may allocate the second advertising content to a second region among the plurality of regions.

According to an exemplary embodiment, the display device 110 may allocate the first advertising content to the first region based on a first distance between the first terminal and the display device 110 and a duration for which the first pairing is maintained.

Also, the display device 110 may allocate the second advertising content to the second region based on a second distance between the second terminal and the display device 110 and a duration for which the second pairing is maintained.

As shown in FIG. 5, in operation S510, the display device 110 may compare the first distance with the second distance. When the first distance is greater than the second distance, the display device 110 may perform operation S520. In contrast, when the first distance is less than the second distance, the display device 110 may perform operation S530.

In operation S520, the display device 110 may compare a first pairing time with a second pairing time. When the first pairing time is less than the second pairing time, the method may proceed to operation S540, and when the first pairing time is greater than the second pairing time, the method may proceed to operation S560.

In operation S530, the display device 110 may compare the first pairing time with the second pairing time. When the first pairing time is greater than the second pairing time, the method may proceed to operation S550, and when the first pairing time is less than the second pairing time, the method may proceed to operation S560.

In operation S540, the display device 110 may set the second region as a region having an area that is greater than that of the first region.

In operation S550, the display device 110 may set the first region as a region having an area that is greater than that of the second region.

In operation S560, the display device 110 may set an area of a portion where each advertising content is to be displayed in consideration of weight values applied to a distance and a pairing time. The weight values may be predetermined or they may be input by a user.

For example, assuming that a weight value of the distance is set to be less than that of the pairing time, even when a difference between the first distance and the second distance is small, if the first pairing time is greater than the second pairing time, the display device 110 may set the first region as a region having an area that is greater than that of the second region.

Although FIG. 5 exemplarily illustrates operations for allocating a plurality of regions to a display screen of the display device 110, it will be understood by one of ordinary skill in the art that some operations may be omitted or added. Exemplary embodiments are not limited to this arrangement.

According to an exemplary embodiment, in at least one of a case in which the second distance is greater than the first distance and a case in which the second pairing time is less than the first pairing time, the display device 110 may allocate the second advertising content to a region having an area that is less than that of the first region.

According to another exemplary embodiment, in at least one of a case in which the second distance is less than the first distance and a case in which the second pairing time is greater than the first pairing time, the display device 110 may allocate the second advertising content to a region having an area that is greater than that of the first region.

Figure 6:
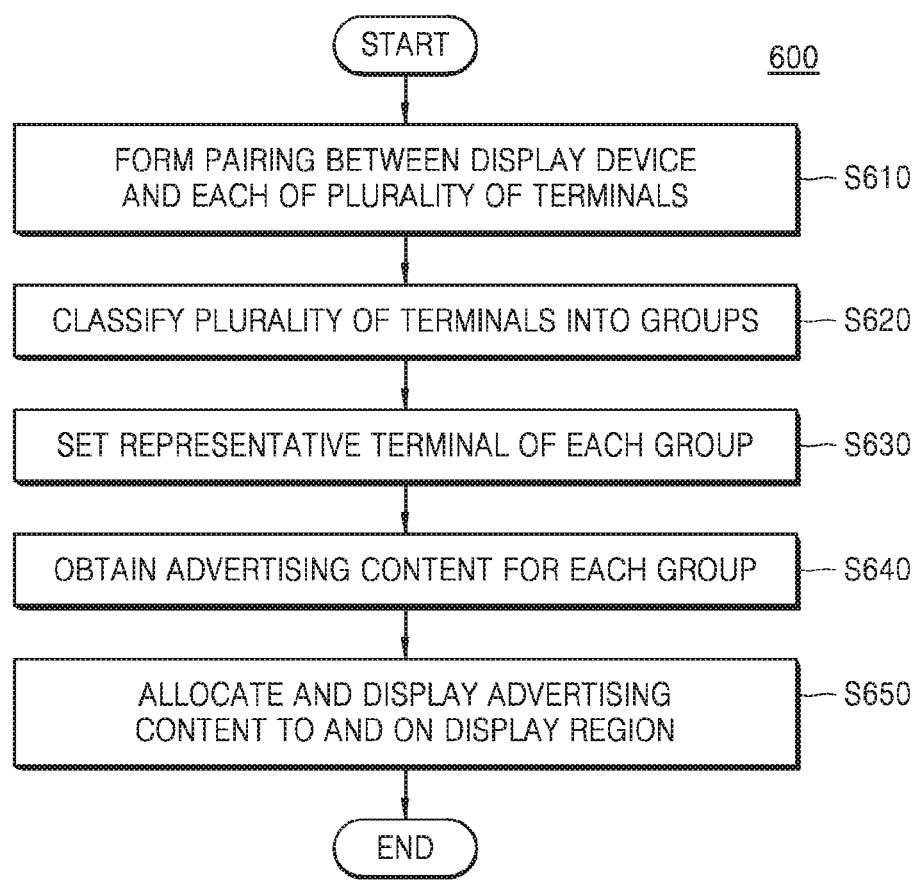
FIG. 6 is a flowchart of a method of providing advertising content, according to another exemplary embodiment.

FIG. 6 is a flowchart of a method of providing advertising content according to another exemplary embodiment.

According to an exemplary embodiment, the display device 110 may detect a plurality of terminals. The display device 110 may classify users of the plurality of terminals into groups and may provide advertising content.

As shown in FIG. 6, in operation S610, the display device 110 may form a pairing with each terminal among the plurality of terminals. The display device 110 may periodically broadcast an advertising message including an ID of the display device 110. The plurality of terminals may receive the advertising message, and may recognize the ID of the display device 110 in the advertising message. The display device 110 may receive IDs of the plurality of terminals from the plurality of terminals. The display device 110 may transmit the received IDs of the plurality of terminals to the advertising server 130.

In operation S620, the display device 110 may classify the plurality of terminals each of which forms a pairing with the display device 110 into groups. The display device 110 may classify the plurality of terminals into groups by using shopping propensity information of a plurality of users respectively corresponding to the plurality of terminals. The shopping propensity information may include at least one of a purchased product, a store, a time of purchase, a payment method for the purchased product, and interests of each of the plurality of users.

In operation S630, the display device 110 may set a representative terminal of each of the groups. The representative terminal may be determined according to a preset condition. For example, the representative terminal may be determined according to a preset condition in which a terminal that is the closest to the display device 110 in each group may be set as a representative terminal. Exemplary embodiments are not limited to this preset condition. A preset condition may be a terminal that is farthest from the display device in each group, or it may be a terminal in the group that has been paired the longest.

In operation S640, the display device 110 may obtain advertising content for each group from the advertising server 130. The display device 110 may obtain the advertising content for each group based on shopping propensity information of the representative terminal.

In operation S650, the display device 110 may allocate to one region and display the advertising content for each group on one region among a plurality of regions.

The display device 110 may allocate the advertising content for each group to one region among the plurality of regions based on a "distance between the representative terminal of each group and the display device 110" and a "duration for which a pairing that is formed between the representative terminal of each group and the display device 110 is maintained".

Figure 7:
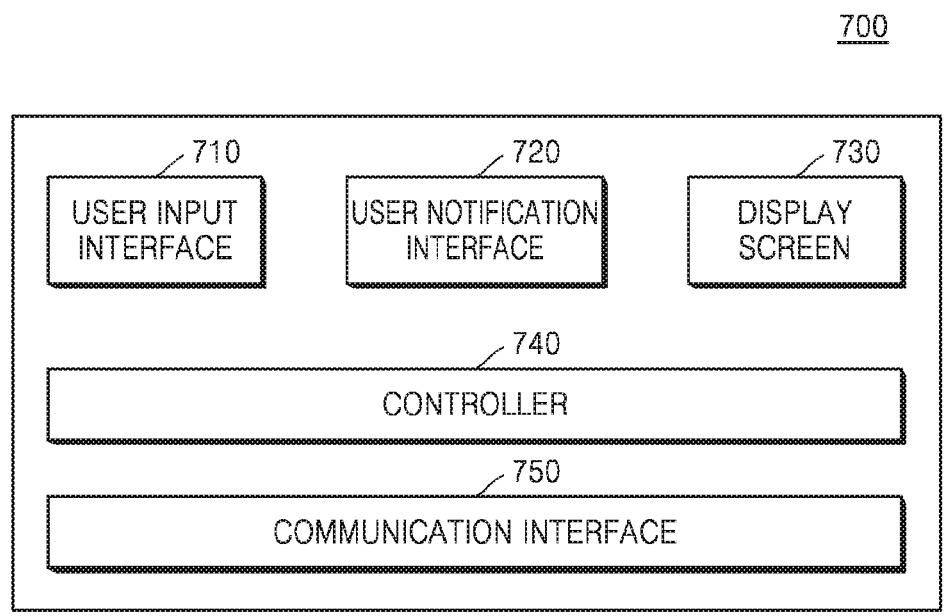
FIG. 7 is a block diagram illustrating a configuration of a terminal according to an exemplary embodiment.

FIG. 7 is a block diagram illustrating a configuration of a terminal 700 according to an exemplary embodiment.

According to an exemplary embodiment, the terminal 700 may include a user input unit 710 (e.g., user input interface), a user notification unit 720 (e.g., user notification interface), a display screen 730, a control unit 740 (e.g., controller), and a communication unit 750 (e.g., communication interface). However, all of the elements illustrated in FIG. 7 are not essential elements, and the terminal 700 according to one or more exemplary embodiments may include more or less elements. The illustrated elements will be described below.

According to an exemplary embodiment, the user input unit 710 may receive a user's input from a keyboard or a touch-screen. When an event occurs, the user notification unit 720 may notify the user that the event occurs. The user notification unit 720 may provide a notification by using a vibration or an alarm sound of the terminal 700. For example, when the terminal 700 receives advertising content or an electronic voucher that is related to the advertising content from the display device 110, the user notification unit 720 may provide a notification by using a vibration or an alarm sound.

According to an exemplary embodiment, the display screen 730 may display the advertising content or the electronic voucher on a display screen. The control unit 740 may receive the advertising content or the electronic voucher and may provide a notification to the user. The communication unit 750 may receive the user's command through the user input unit 710 from the user and may communicate with the display device 110.

According to an exemplary embodiment, the terminal 700 may receive a signal including an advertising message through Bluetooth from the display device 110 and may perform an operation according to an intensity of the received signal.

According to an exemplary embodiment, the terminal 700 may receive an advertising message from the display device 110 and may connect to the display device 110 through Bluetooth. The terminal 700 may receive advertising content from the display device 110 by using the Bluetooth.

Figure 8:
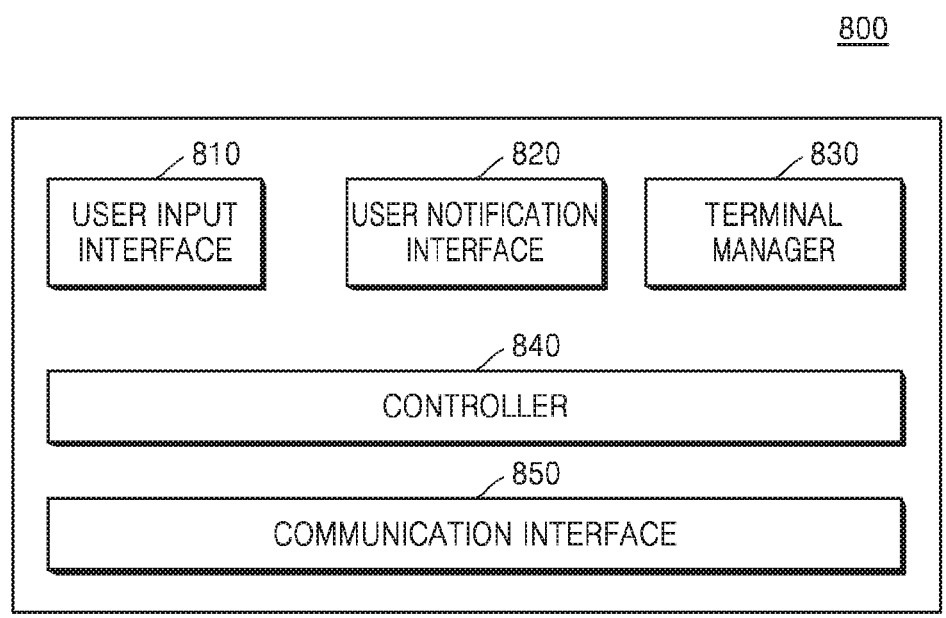
FIG. 8 is a block diagram illustrating a configuration of a display device according to another exemplary embodiment.

FIG. 8 is a block diagram illustrating a configuration of a display device 800 according to another exemplary embodiment.

According to an exemplary embodiment, the display device 800 may include a user input unit 810 (e.g., user input interface), a user notification interface 820, a terminal manager 830, a controller 840, and a communication unit 850 (e.g., communication interface). However, all of the elements illustrated in FIG. 8 are not essential elements. The display device 800 according to one or more exemplary embodiments may include more or less elements. The illustrated elements will be described below.

According to an exemplary embodiment, the user input unit 810 may receive an input from a user. The user input unit 810 may receive the input through a touch-screen. Exemplary embodiments are not limited to this. The user notification interface 820 may display advertising content on a display screen. The user notification interface 820 may display the advertising content that is obtained based on shopping propensity information of a user of a first terminal on a first region among a plurality of regions.

According to an exemplary embodiment, the terminal manager 830 may manage a list of terminals that are located in the vicinity of the display device 800. The display device 800 may calculate distances by using intensities of signals received from the terminals and may arrange or divide the terminals according to the distances.

According to an exemplary embodiment, the controller 840 may communicate with the terminal manager 830 and may control a user advertisement to be displayed on the user notification interface 820.

According to an exemplary embodiment, the communication unit 850 may periodically broadcast an advertising message including an ID. A terminal that is located in the vicinity of the display device 800 may receive the advertising message and may recognize the ID in the advertising message. The terminal that is located in the vicinity of the display device 800 may transmit an ID and information of the terminal to the communication unit 850. The communication unit 850 may transmit advertising content to the terminal that is located in the vicinity of the display device 800. The communication unit 850 may communicate with the terminal that is located in the vicinity of the display device 800 and an advertising server through a network.

Figure 9:
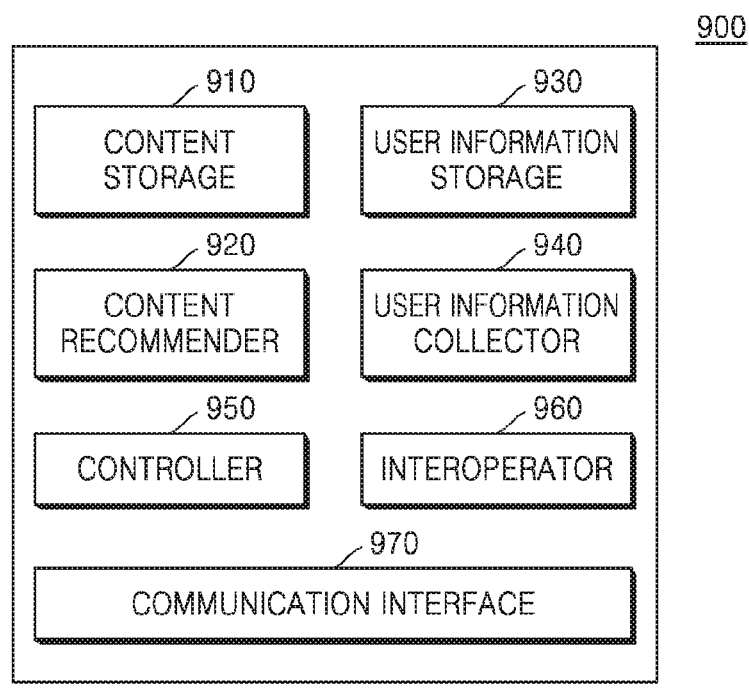
FIG. 9 is a block diagram illustrating a configuration of an advertising server according to an exemplary embodiment.

FIG. 9 is a block diagram illustrating a configuration of an advertising server 900 according to an exemplary embodiment.

According to an exemplary embodiment, the advertising server 900 may include a content storage 910, a content recommendation unit 920 (e.g., content recommender), a user information storage 930, a user information collecting unit 940 (e.g., user information collector), a control unit 950 (e.g., controller), an interoperation unit 960 (e.g., interoperator), and a communication unit 970 (e.g., communication interface). All of the elements illustrated in FIG. 9 are not essential elements. The advertising server 900 according to one or more exemplary embodiments may include more or less elements. The illustrated elements will be described below.

According to an exemplary embodiment, the content storage 910 may store advertising content. The content recommendation unit 920 may recommend the advertising content of the content storage 910 by using user information stored in the user information storage 930. The content recommendation unit 920 may resize the advertising content and may transmit the resized advertising content according to a type and a display type of a terminal that receives the advertising content.

According to an exemplary embodiment, the user information storage 930 may store advertising content and a touch input history on a display screen of a display device according to users. Stored information may be determined as detailed advertisement elements, and the user information storage 930 may rate and classify the users.

According to an exemplary embodiment, the user information collecting unit 940 may receive user information from the display device and may store the user information in the user information storage 930. Also, the user information collecting unit 940 may receive data from an external apparatus and may store the data in the user information storage 930.

According to an exemplary embodiment, the control unit 950 may detect an advertisement that is to be provided to a user among a plurality of advertisements based on the user information. The interoperation unit 960 may communicate with the external apparatus to collect the user information. The interoperation unit 960 may receive and store the user information from the external apparatus.

According to an exemplary embodiment, the communication unit 970 may communicate with the terminal and the display device through a network.

Figure 10:
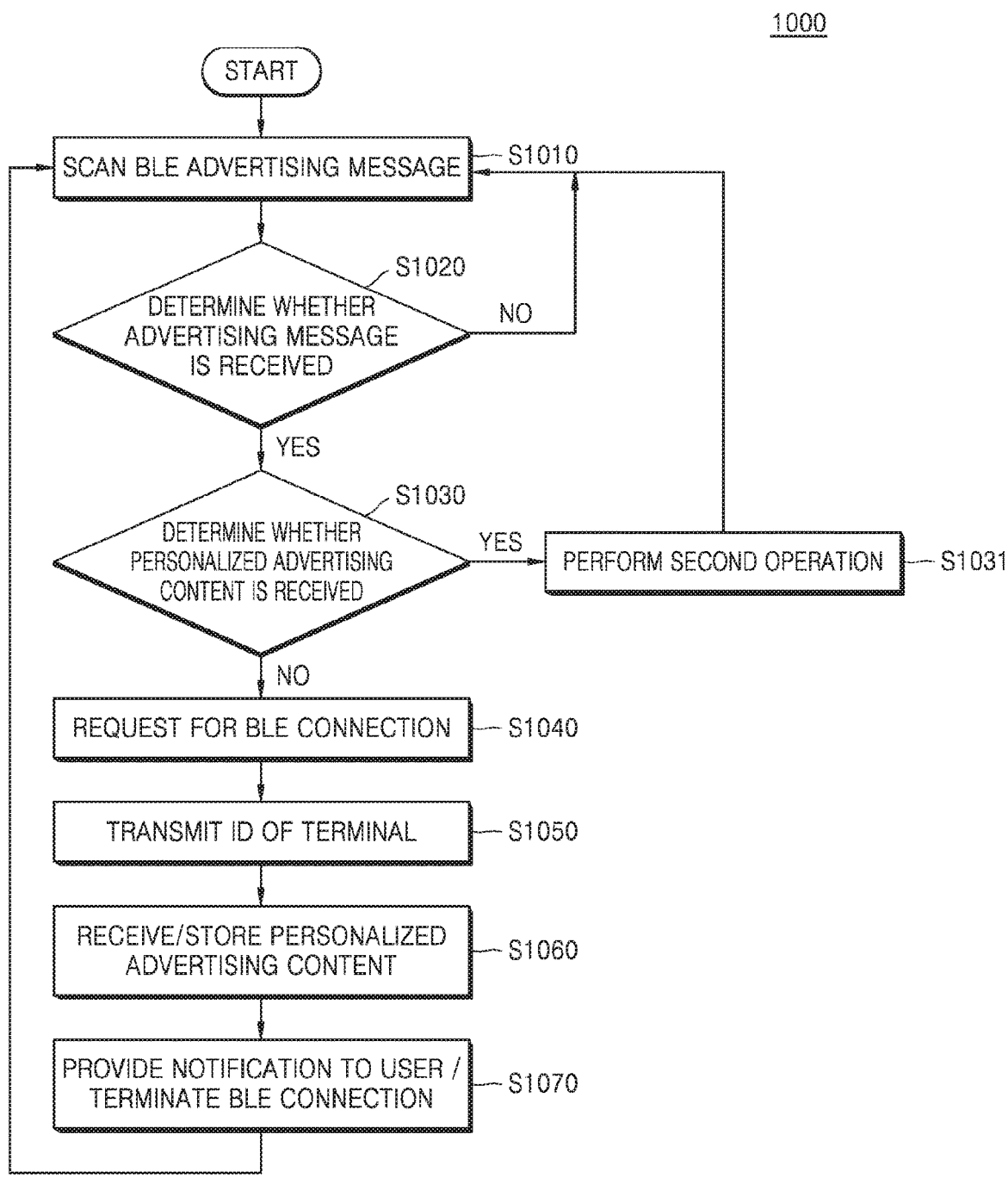
FIG. 10 is a flowchart of a method performed by a terminal to receive advertising content, according to an exemplary embodiment.

FIG. 10 is a flowchart of a method performed by the terminal 120 to receive advertising content, according to an exemplary embodiment.

According to an exemplary embodiment, the terminal 120 may first find the display device 110, connect to the display device 110, and receive advertising content from the display device 110.

As shown in FIG. 10, in operation S1010, the terminal 120 may scan an advertising message that is transmitted (e.g., using Bluetooth Low Energy (BLE)) from the display device 110.

In operation S1020, the terminal 120 may find the display device 110, and may determine whether the advertising message is received from the display device 110. Step S1020 will loop back to S1010 until it receives an advertising message.

In operation S1030, the terminal 120 may determine whether personalized advertising content that is customized for a user is received. If it is determined in operation S1030 that the personalized advertising content is received, the method proceeds to operation S1031. In operation S1031, the terminal 120 may perform a second operation. The second operation will be explained in detail below with reference to FIG. 12. The second operation ranges from operation S1140 to operation S1170 of FIG. 11.

If it is determined in operation 1030 that the personalized advertising content is not received, the method proceeds to operation S1040. In operation S1040, the terminal 120 may request the display device 110 for Bluetooth connection (e.g., BLE).

In operation S1050, the terminal 120 may transmit an ID of the terminal 120 to the display device 110. The ID of the terminal 120 may be a MAC address. The advertising server 130 that stores and manages an ID of a user according to each MAC address may recognize a user of the terminal 120. A first MAC address may be mapped to an ID of a user. Similarly, an arbitrary ID that is issued by the advertising server 130, instead of a MAC address, may be stored and used in the terminal 120. Therefore, privacy at a Bluetooth communication terminal may be protected. The terminal 120 may directly transmit a membership ID or a name of the user of the terminal 120, instead of a MAC address or an arbitrary ID, to the advertising server 130 through the display device 110.

In operation S1060, the terminal 120 may receive the personalized advertising content for the terminal 120 from the display device 110 and may store the personalized advertising content.

In operation S1070, when the terminal 120 receives the personalized advertising content, the terminal 120 may provide a notification to the user. Also, when the terminal 120 receives the personalized advertising content, the terminal 120 may terminate the Bluetooth connection with the display device 110. Even when communication connection with the display device 110 is terminated, the terminal 120 may perform the method beginning from operation S1010 when scanning an advertising message from the display device 110.

Figure 11:
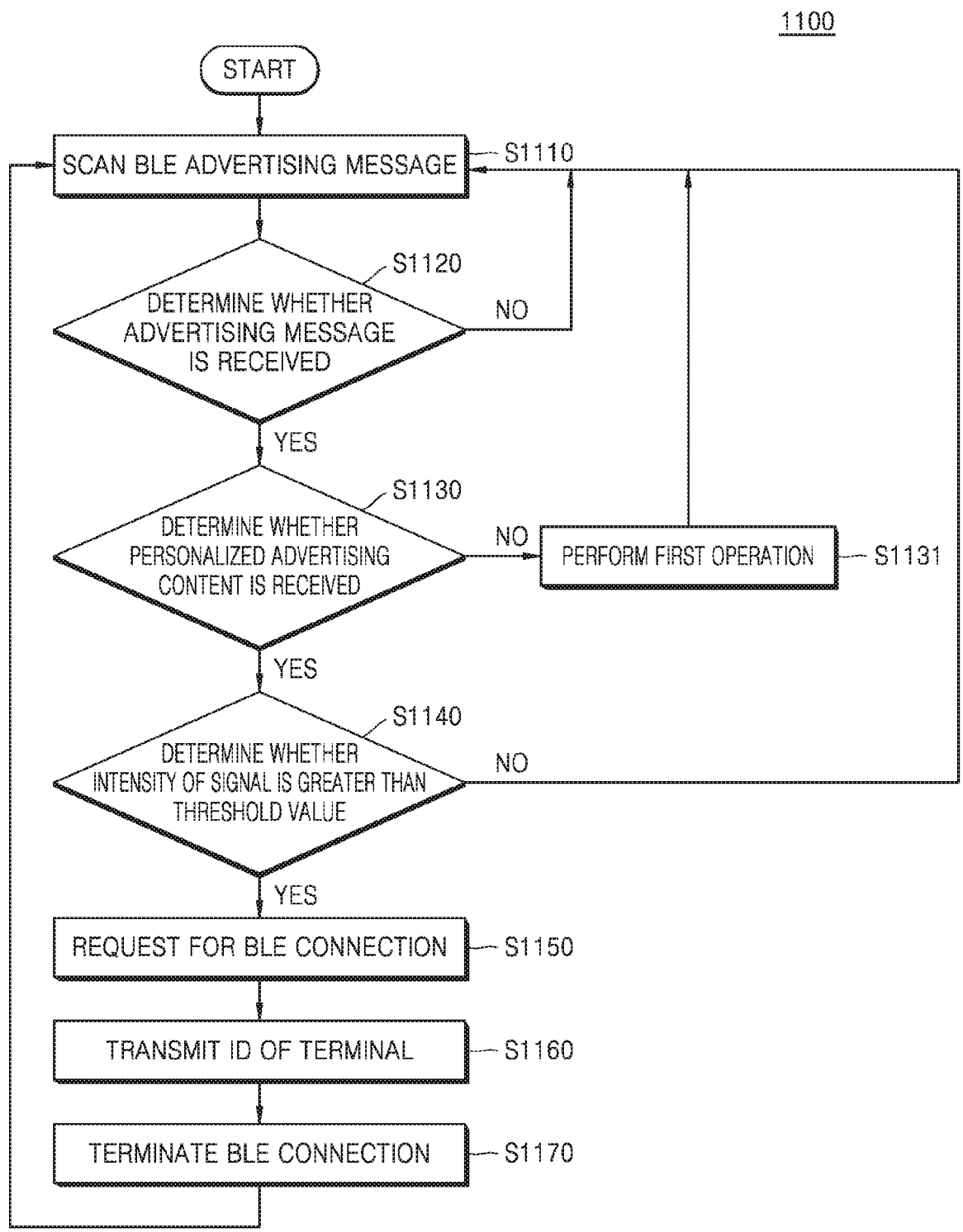
FIG. 11 is a flowchart of a method performed by a terminal to receive advertising content, according to another exemplary embodiment.

FIG. 11 is a flowchart of a method performed by the terminal 120 to receive advertising content according to another exemplary embodiment.

According to an exemplary embodiment, when the terminal 120 is located within a predetermined range of the display device 110, the terminal 120 may notify the display device 110 of the existence of the terminal 120 and may allow a personalized advertisement to be displayed on a display screen of the display device 110.

As shown in FIG. 11, in operation S1110, the terminal 120 may scan an advertising message that is transmitted from the display device 110.

In operation S1120, the terminal 120 may find the display device 110, and may determine whether the advertising message is received from the display device 110. Step S1120 will loop back to S1110 until it receives an advertising message.

In operation S1130, the terminal 120 may determine whether personalized advertising content that is customized for a user is received. If it is determined in operation S1130 that the personalized advertising content is not received, the method proceeds to operation S1131. In operation S1131, the terminal 120 may perform a first operation. The first operation has been explained in detail with reference to FIG. 10. The first operation ranges from operation S1040 to operation S1070 of FIG. 10.

If it is determined in operation S1030 that the terminal 120 receives the personalized advertising content, the method proceeds to operation S1140. In operation S1140, the terminal 120 may determine whether an intensity of a signal that is received from the display device 110 is greater than a threshold value. If it is determined in operation S1140 that the intensity of the received signal is less than the threshold value, the method returns to operation S1110 in which the terminal 120 scans an advertising message from the display device 110.

If it is determined in operation S1140 that the intensity of the received signal is greater than the threshold value, the method proceeds to operation S1150. In operation S1150, the terminal 120 may request the display device 110 for Bluetooth connection.

In operation S1160, the terminal 120 may connect to the display device 110 and may transmit an ID of the terminal 120. Therefore, the personalized advertising content corresponding to the terminal 120 may be transmitted and rendered to the display device 110.

In operation S1170, the terminal 120 may terminate the Bluetooth connection with the display device 110. Even when communication connection with the display device 110 is terminated, the terminal 120 may perform the method beginning from operation S1110 when scanning an advertising message from the display device 110.

Figure 12:
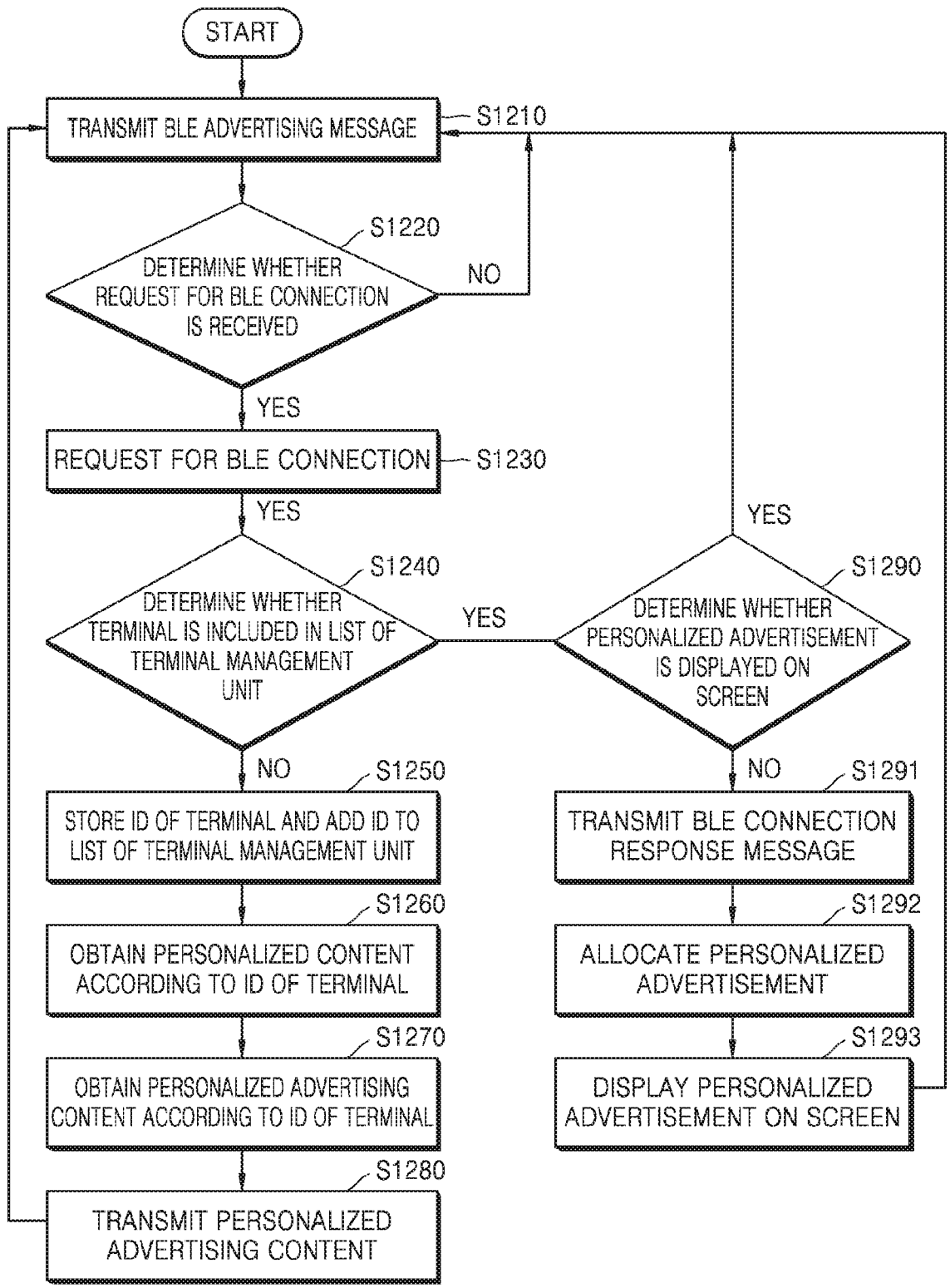
FIG. 12 is a flowchart of a method performed by a display device for providing advertising content, according to an exemplary embodiment.

FIG. 12 is a flowchart of a method performed by the display device 110 to provide advertising content, according to an exemplary embodiment.

As shown in FIG. 12, in operation S1210, the display device 110 may transmit a Bluetooth advertising message to a plurality of the terminals 120 that are located in the vicinity of the display device 110. The display device 110 may periodically transmit an advertising message and may wait for a connection request from any of the terminals 120.

In operation S1220, the display device 110 may receive a message that requests a Bluetooth connection from the terminal 120 that receives the Bluetooth advertising message.

In operation S1230, the display device 110 may transmit a Bluetooth connection response message to the terminal 120.

In operation S1240, the display device 110 may determine whether the terminal 120 that requests for the Bluetooth connection is registered in a terminal management unit. The display device 110 may determine whether the terminal 120 is already registered in the terminal management unit by checking a list.

When it is determined in operation S1240 that the terminal 120 is not registered in the terminal management unit, the method proceeds to operation S1250. In operation S1250, the display device 110 may store an ID of the terminal 120 may add the ID of the terminal 120 to the list of the terminal management unit.

In operation S1260, the display device 110 may obtain personalized content according to the ID of the terminal 120.

In operation S1270, the display device 110 may obtain personalized advertising content according to the ID of the terminal 120.

In operation S1280, the display device 110 may transmit the personalized advertising content.

If it is determined in operation S1240 that the terminal 120 is registered in the terminal management unit, the method proceeds to operation S1290. In operation S1290, the display device 110 may determine whether a personalized advertisement is displayed on a display screen.

If it is determined in operation S1290 that the personalized advertisement is not displayed on the display screen, the method proceeds to operation S1291. In operation S1291, the display device 110 may transmit a Bluetooth connection response message to the terminal 120.

In operation S1292, the display device 110 may obtain advertising content from the advertising server 130 based on shopping propensity information of a user of the terminal 120 and may set an advertisement region on the display screen.

In operation S1293, the display device 110 may display the personalized advertising content on the display screen.

The above-described exemplary embodiments may be realized in a form of a hardware component, a software component, and/or a combination of a hardware component and a software component. For example, the device and corresponding components according to the above-described exemplary embodiments may be realized by using one or more universal computers or special-purpose computers such as a processor, a controller, an arithmetic logic unit (ALU) a digital signal processor, a field programmable array (FPA), a programmable logic unit (PLU), a microprocessor, or any type of device that can execute and respond to an instruction (or command).

A processing device may execute an operating system (OS) and at least one software application, which is executed within the OS. Additionally, the processing device may respond to the execution of a software application, to access, store, manipulate process, and generate data.

For simplicity, exemplary embodiments may be described to include only one processing device. However, it will be apparent to one of ordinary skill in the art that the processing device may include a plurality of processing elements and/or may include multiple types of processing elements. For example, the processing device may include multiple processors, or the processing device may include one processor and one controller. Additionally, other processing configurations, such as a parallel processor, may be possible.

The software may include a computer program, a code, an instruction, or a combination of one or more of the above. And, the software may configure a processing device, so that the processing device can be operated as intended, or the software may independently or collectively instruct (or command) the processing device.

To be interpreted by the processing device, or to provide an instruction or data to the processing device, the software and/or data may be permanently or temporarily embodied in any type of machine, component, physical equipment (or device), virtual equipment, computer storage medium or device, or transmitted signal wave. Because the software is dispersed (or scattered) within a computer system being connected to a network, the software may be stored or executed by using a dispersion method. The software and data may be stored in one or more computer-readable recording media.

A method according to one or more exemplary embodiments may be realized in a program command (or instruction) format that may be executed by using diverse computing means, to be recorded in a computer-readable medium. Herein, the computer-readable medium may include a program command (or instruction), a data file, a data structure, and so on, or any combination thereof. The program command being recorded in the medium may correspond to a program command that is designed and configured for one or more exemplary embodiments, or the program command may correspond to a program command that is disclosed and available to anyone.

Examples of a computer-readable recording medium include magnetic media such as hard discs, floppy discs, and magnetic tapes, optical media such as CD-ROMs and DVDs, magneto-optical media such as floptical discs, and hardware devices configured (or designed) for storing and executing program commands such as ROMs, RAMs, and flash memories.

Examples of a program command may include not only machine language codes, which are created by a compiler, but may also include high-level language codes, which may he executed by a computer by using an interpreter, and so on.

The above-mentioned hardware equipment may be configured to be operated as one or more software modules for executing the operations of one or more exemplary embodiments, and vice versa.

It will be apparent to one of ordinary skill in the art that various modifications and variations can be made without departing from the spirit or scope of the present disclosure. For example, the above-described techniques may he executed in a different order than that described in the description, and/or the components of the above-described system, structure, equipment (or device), circuit, etc., may be combined differently than the above-described exemplary embodiments, and goals may be achieved even if the above-described components are replaced by another component or its equivalent.

Thus, the scope of the is not limited to one or more exemplary embodiments and is defined by the appended claims and their equivalents.

What is claimed is:

1. An electronic device comprising:
    a communication interface configured to communicate with a first terminal and a second terminal;
    a processor configured to:
        obtain first advertising content based on first information related to the first terminal, and second advertising content based on second information related to the second terminal,
        determine a size of a first region based on a first duration for which a first pairing between the first terminal and the electronic device is maintained, and a size of a second region based on a second duration for which a second pairing between the second terminal and the electronic device is maintained,
    a display configured to display the first advertising content on the first region and display the second advertising content on the second region.

2. The electronic device of claim 1, wherein the size of the first region and the size of the second region are different from each other.

3. The electronic device of claim 1, wherein the processor is further configured to obtain a first distance information between the first terminal and the electronic device, and obtain a second distance information between the second terminal and the electronic device,
    wherein the size of the first region and the size of the second region are determined further based on the first distance information and the second distance information.

4. The electronic device of claim 3, wherein if the second distance information is greater than the first distance information, the size of the second region is less than the size of the first region, and if the first distance information is greater than the second distance information, the size of the first region is less than the size of the second region.

5. The electronic device of claim 3, wherein if at least one from among the second distance information is less than the first distance information and the second duration is greater than the first duration, the size of the second region is greater than the size of the first region.

6. The electronic device of claim 3, wherein the processor is further configured to determine the size of the first region and the size of the second region based of a weighted summation of the first duration and the first distance information, and a weighted summation of the second duration and the second distance information.

7. The electronic device of claim 1, wherein the processor is further configured to form a pairing with each terminal among a plurality of terminals through the communication interface,
    the processor is further configured to provide a plurality of advertising contents to the first region and the second region, respectively, and allocate the plurality of advertising contents to the first region and the second region of the display, and
    the display is configured to display the plurality of advertising contents on the first region and the second region.

8. The electronic device of claim 7, wherein the processor is further configured to:

classify a plurality of users respectively corresponding to the plurality of terminals into a plurality of groups by using propensity information of the plurality of users, and receive advertising content for each group from an advertising server, and allocate the advertising content for each group to one region among the first region and the second region based on at least one from among a distance between a representative terminal of each group and the electronic device and a duration for which pairing formed between the representative terminal and the electronic device is maintained.

9. The electronic device of claim 1, further comprising an input interface configured to receive an input of a user of the first terminal that is related to the first advertising content, and an input of a user of the second terminal that is related to the second advertising content.

10. The electronic device of claim 9, wherein the processor is further configured to, via the display, display first additional content on the first region in response to the input of the user of the first terminal, and display second additional content on the second region in response to the input of the user of the second terminal.

11. The electronic device of claim 1, wherein the first information is first propensity information of a user of the first terminal, and the second information is second propensity information of a user of the second terminal.

12. The electronic device of claim 11, wherein the first propensity information and the second propensity information are stored in an advertising server and is based on at least one from among a purchased product, a store, a time of purchase, a payment method for the purchased product, and interests of the user of the first terminal and the user of second terminal, respectively.

13. The electronic device of claim 1, wherein the processor is further configured to provide at least one from among the first advertising content and an electronic voucher that is related to the first advertising content to the first terminal, and provide at least one from among the second advertising content and an electronic voucher that is related to the second advertising content to the second terminal.

14. A method performed by an electronic device, the method comprising:
communicating with a first terminal and a second terminal;
obtaining first advertising content based on first information related to the first terminal, and second advertising content based on second information related to the second terminal;
determining a size of a first region based on a first duration for which a first pairing between the first terminal and the electronic device is maintained, and a size of a second region based on a second duration for which a second pairing between the second terminal and the electronic device is maintained;
displaying the first advertising content on the first region and display the second advertising content on the second region.

15. The method of claim 14, wherein a size of the first region and a size of the second region are different from each other.

16. The method of claim 14, further comprising:
obtaining a first distance information between the first terminal and the electronic device; and
obtaining a second distance information between the second terminal and the electronic device,
wherein the size of the first region and the size of the second region are determined further based on the first distance and the second distance.

17. The method of claim 16, wherein if the second distance information is greater than the first distance information, the size of the second region is less than the size of the first region, and if the first distance information is greater than the second distance information, the size of the first region is less than the size of the second region.

18. The method of claim 16, wherein if at least one from among the second distance information is less than the first distance information and the second duration for which the second pairing is maintained is greater than the first duration for which the first pairing is maintained, the size of the second region is greater than the size of the first region.

19. The electronic device of claim 16, wherein the determining of the size of the first region and the second region comprises determining the size of the first region and the size of the second region based of a weighted summation of the first duration and the first distance information, and a weighted summation of the second duration and the second distance information.

20. A non-transitory computer-readable recording medium having embodied thereon a program for executing a method performed by a electronic device, the method comprising:
communicating with a first terminal and a second terminal;
obtaining first advertising content based on first information related to the first terminal, and second advertising content based on second information related to the second terminal;
determining a size of a first region based on a first duration for which a first pairing between the first terminal and the electronic device is maintained, and a size of a second region based on a second duration for which a second pairing between the second terminal and the electronic device is maintained;
displaying the first advertising content on the first region and display the second advertising content on the second region.

* * * * *